United States Patent [19]

Taketani et al.

[11] Patent Number: 5,478,518
[45] Date of Patent: Dec. 26, 1995

[54] POLYCARBONATE FILM FOR OPTICAL PURPOSES AND A PRODUCTION PROCESS THEREOF

[75] Inventors: Yutaka Taketani, Kunitachi; Kaoru Iwata, Hachioji; Hideaki Nitta; Utami Yonemura, both of Hino; Takeshi Sasaki, Hachioji, all of Japan

[73] Assignee: Teijin Limited, Osaka, Japan

[21] Appl. No.: 214,566

[22] Filed: Mar. 18, 1994

[30] Foreign Application Priority Data

Oct. 4, 1993 [JP] Japan .................. 5-248082
Oct. 21, 1993 [JP] Japan .................. 5-263701

[51] Int. Cl.$^6$ .................. B29C 39/38; B29D 11/00
[52] U.S. Cl. .................. 264/216; 264/1.34; 264/2.6; 524/108; 528/196; 528/501
[58] Field of Search .................. 264/2.6, 216, 1.34; 524/108; 528/196, 501

[56] References Cited

U.S. PATENT DOCUMENTS

| | | | |
|---|---|---|---|
| 2,964,797 | 12/1960 | Peilstocker | 264/216 |
| 3,164,651 | 1/1965 | Chu | 264/216 |
| 4,607,070 | 8/1986 | Schreckenberg | 525/469 |

FOREIGN PATENT DOCUMENTS

| | | |
|---|---|---|
| 0488369 | 6/1984 | European Pat. Off. . |
| 0111663 | 6/1992 | European Pat. Off. . |
| 4005928 | 8/1990 | Germany . |

OTHER PUBLICATIONS

Kambour "BPA Polycarbonate Immersed in Organic Media"; Macromolecules 7(2) pp. 248–253, Mar. 1974.

*Primary Examiner*—David Buttner
*Attorney, Agent, or Firm*—Sughrue, Mion, Zinn, Macpeak & Seas

[57] ABSTRACT

The present invention is to provide a polycarbonate film excellent in optical properties such as high transparency and a process for producing it. The present invention relates to a polycarbonate film having a specific retardation value, and a process for producing a polycarbonate film by casting a dope onto a support and evaporating the solvent with heat wherein the dope is prepared by dissolving 10 parts by weight of polycarbonate resin in 30 to 150 parts by weight of the solvent mixture which contains more than 60% by weight of dioxolane.

4 Claims, 1 Drawing Sheet

POLYCARBONATE FILM FOR OPTICAL PURPOSES AND A PRODUCTION PROCESS THEREOF

BACKGROUND OF THE INVENTION

1. Field of the Invention

The present invention relates to a polycarbonate film and a production process thereof.

2. Description of the Related Arts

Polycarbonate film has been used in packaging, optical devices, display devices and other various applications in industry. Recently increasing attention has been paid to the film as a material for optoelectronic devices, and the practical application has been forwarded in retardation plates, polarization plates, plastic substrate, for example, in liquid crystal displays. Particularly, in the most remarkably progressing STN liquid crystal displays, the polycarbonate film is attracting attention as a phase-difference layer used in the space between the liquid crystal layer and the polarization layer for improving the image visibility, when it is seen from the front and oblique positions. This phase difference film plays a role of converting the elliptically polarized light passing through the liquid crystal layer into the linearly polarized light, and the material is composed of a monoaxially oriented polycarbonate film mainly from bisphenol-A. The reasons why the film is used are that it has excellent properties which the phase-different plates are required for, example, (1) high transparency, (2) optical anisotropy relatively easy to be controlled, (3) relatively high heat resistance, and (4) high uniformity.

But, the film of polycarbonate from bisphenol-A also has disadvantages. In general, this film is produced by casting a bisphenol-A polycarbonate solution in methylene chloride in order to attain the high level of uniformity, but the film for phase different plates or liquid crystal base plates is thick and requires to be cast from dope of high polymer concentration. But, the solubility of the polymer is about 20% by weight, not always adequately high. Moreover, the polymer cannot be stable in the dope of high concentration, and frequently causes cloudiness or gelation due to crystallization with the passage of time, especially the crystallization occurs during the film-making process in many cases.

Further, the film used in these optoelectronic devices is required as an electronic part not to give adverse effect on the surrounding parts, for example, not to develop chloride ions by decomposition caused by exposure to the atmospheres of high temperature and high humidity for a long period of time. Customarily, the cast polycarbonate film from the solution in methylene chloride but it difficult to say that this polycarbonate film satisfactorily meets these requirements.

In the film for phase different plate and liquid crystal base plate, a high degree of surface flatness and controlled orientation are required, but it is not easy to give the products of high quality, satisfying these requirements from the above-mentioned solution in methylene chloride.

In the production of such film, the casting process where a film-forming solution is dried is employed instead of the extrusion process in order to maintain the uniformity. When the solution (dope) is formed, halogenated hydrocarbon such as methylene chloride has been mainly employed in high frequency. But, these solvents include halogen and liberate hydrogen halide, typically hydrogen chloride, by reaction with moisture in air, while the solvent component is evaporated and vaporized off, and the hydrogen halide often causes corrosion of the base plate and environmental problems, for example, deterioration of working environments.

Further, trace amounts of halogen elements such as chlorine remains in the film or base sheet which is made by casting the dope in a halogenated solvent. The adverse effects of remaining halogen on ITO (indium oxide) constituting the transparent electrodes and the components constituting TFT (thin film transistor) are concerned. The anxiety becomes more serious, particularly when the film is formed by casting a polycarbonate solution in a halogen-containing solvent boiling at a high temperature.

Moreover, the solvent such as methylene chloride or tetrachloroethane has high affinity for polycarbonate, and shows a tendency of increasing viscosity of the solution. Thus, the troubles in handling are caused because the solution viscosity becomes extremely high, even when the solutions of the same concentration are prepared. Conversely, in order to keep the viscosities equal, it becomes disadvantageously difficult to dissolvent polycarbonate of high polymerization degree into a solution of a favorable concentration for film making.

When the resin solutions of a polymer are prepared from different solvents, the viscosities are governed by the interaction between the polymer and the solvents. In general, the solvent giving the solution of a higher viscosity has higher affinity to the resin than the solvent giving a low viscosity and the resin distributes in a linearly extended form in which the molecules tend to cause entanglement, while in the low-affinity solvent, the molecules shrink in a round form to lower their entanglement. Usually, polycarbonate solution in methylene chloride has a high viscosity and the film cast from the solution tends to be orientated, resulting in a defectively large retardation.

In the meantime, it is also possible to prepare a dope by dissolving polycarbonate in tetrahydrofuran, a halogen-free solvent, and a process can be imaged for casting the dope on a suitable support and giving thin film by evaporating the solvent to dryness. But, it cannot be said that tetrahydrofuran is a suitable solvent for polycarbonate. For example, the polycarbonate solution in tetrahydrofuran changes into gel with the passage of time, when the concentration exceeds 10% by weight, although the tendency depends upon the molecular weight of the resin. In other words, at first the increase of apparent solution viscosity is noticed, then occurrence of turbidness and gel formation with complete turbidness are observed, and finally the fluidity is lost. Thus, practical application of the dope has met serious problems. Further, the film of a large thickness cast from the solution in tetrahydrofuran frequently develops cloudiness on the way of drying.

As above-mentioned, the solution in tetrahydrofuran has a problem on its stability, while methylene chloride which has been mainly used as a solvent for polycarbonate has environmental problems. In other words, methylene chloride is possibly carcinogenic and may be regulated in the near future. Moreover, methylene chloride boils at a low temperature (boiling point: 41° C.) and easily vaporizes off from the film-making system, thus doubling the environmental pollution.

Therefore, the use of dioxane has been proposed as a substitute for tetrahydrofuran in Japan Patent Specification Laid-open No. Tokkai-Hei 2-227456. Dioxane is, however, a cyclic ether bearing ether linkages in 1-, and 4-positions and their polarities are canceled by each other and it can be presumed that there is a limit in the ability to dissolve a polar polymer such as polycarbonate. Actually, polycarbonate is not dissolved in dioxane in the concentration higher than 20% by weight in many cases.

SUMMARY OF THE INVENTION

An object of the present invention is to produce a polycarbonate film having excellent optical properties and high transparency from the dope of high stability because of its halogen-free composition and low viscosity. Another object of the present invention is to provide a film of polycarbonate having excellent optical properties, which can give a display with reduced view angle-dependency, when it is applied to liquid crystal display units.

The present inventors have made investigation over a wide range of the solvents and conditions optimally suitable for cast film production and the like and attained the present invention.

Namely, the present invention is a process for producing polycarbonate film by casting the dope on a support (substrate) and drying it with heat wherein the 10 parts by weight of a polycarbonate resin are dissolved in 25 to 150 parts by weight of a solvent containing more than 60% by weight of dioxolane and the resultant dope is used in film production.

DESCRIPTION OF THE PREFERRED EMBODIMENT

The present invention uses the polycarbonate dope which is prepared by using a solvent composition mainly comprising dioxolane. The dope has excellent storage stability and is suitable for the production of polycarbonate film by casting. Dioxolane is a 5-membered cyclic diether which has the etheric oxygen atoms in the 1-, and 3-positions and boils at about 76° C.

In the present invention, the solvent used in dissolving polycarbonate is desirably single dioxolane or a mixed solvent containing more than 60% by weight or preferably more than 80% by weight of dioxolane. Less than 60% by weight is undesirable because the performance peculiar to dioxolane is not exhibited. The solvent coexisting with dioxolane in the mixture in an amount less than 40% by weight is at least one of organic solvent selected from, for example, cyclohexanone, tetrahydrofuran, dioxane and the like and can prepare a stabilized polycarbonate dope for casting film in accordance with the present invention. The amount and the kind of the solvents to be added can be decided depending on the purpose and the effect of the addition, for example, improvement in the surface smoothness of the cast product (leveling effect) and the control of evaporation rate or viscosity of the system.

It is also possible, when needed, to employ a halogenated hydrocarbon solvent such as methylene chloride or dichloroethane as a solvent to be mixed with dioxolane within the range where the amount of the halogen remaining in the film becomes not excessive. According to the present invention, the halogen ion, especially chloride ion, can be kept low, thus the film can be expected to reveal excellent performance as a part of liquid crystal display or an electronic part which are used under severe conditions for a long period of time.

In the dope according to the present invention, the ratio of the polycarbonate dissolved to the solvent is desirably 25 to 150 parts by weight of the solvent to 10 parts by weight of the polycarbonate resin, in other words, the concentration of polycarbonate is 6 to 29% by weight in the dope. The increase of the polycarbonate fraction is undesirable because the progress of crystallization is observed and flowability is reduced, while the increase in the solvent fraction more than 150 parts by weight is also practically undesirable because the effective concentration is reduced although there is no problem on the storage stability of the dope. From the solution operability point of view, it is more preferred that 25 to 100 parts by weight of the solvent is desired to 10 parts by weight of the polycarbonate resin.

The polycarbonate used in the present invention is not limited particularly. No limitation is applied, if the polycarbonate can give the film having desired properties. Generally, the macromolecular material called polycarbonate has the major chain linked with carbonate groups, but typically means the polycondensate from bisphenol and phosgene or diphenyl carbonate. Usually, the polycarbonate having the recurring units given below using 2,2-bis(4-hydroxyphenyl)propane called bisphenol-A as a bisphenol component is preferably selected, but various kinds of polycarbonate copolymers can be prepared by selecting different kinds of bisphenol derivatives suitably.

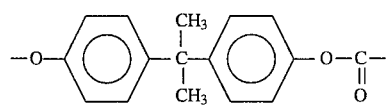

The copolymerization components include, other than bisphenol-A, bis(4-hydroxyphenyl)methane, 1,1-bis(4-hydroxphenyl)cyclohexane (abbreviated to bisphenol-Z hereinafter), 9,9-bis(4-hydroxyphenyl)fluorene (abbreviated to bisphenol-FL), 1,1-bis(4-hydroxyphenyl)-3,3,5-trimethylcyclohexane, 2,2-bis(4-hydroxy-3-methylphenyl)propane, 2,2-bis(4-hydroxyphenyl)-2-phenyl-ethane, 2,2-bis(4-hydroxyphenyl-1,1,1,3,3,3-hexafluoropropane, bis(4-hydroxyphenyl)diphenylmethane, bis(4-hydroxyphenyl)sulfide, bis(4-hydroxyphenyl)sulfone or the like. Further, it is possible to use polyester-carbonate containing partially terephthalic acid and/or isophthalic acid components. The partial inclusion of such polyester units in bisphenol-A polycarbonate units can improve the properties such as heat resistance and solubility of the polycarbonate.

The polycarbonate which can be suitably used here has 10,000 to 200,000 viscosity-average molecular weight. The molecular weight of from 20,000 to 120,000 is particularly preferred. The film of lower than 10,000 viscosity-average molecular weight is occasionally insufficient in its mechanical strength, while more than 200,000 causes excessive increase in the dope viscosity and is undesirably confronted by the problems on handleability. The viscosity-average molecular weight has been calculated by substituting the Mark-Houwink-Sakurada equation with the intrinisic viscosity measured in the polycarbonate solution in methylene chloride. The various coefficients in this calculation are describe in, for example, "Polymer Handbook" 3rd Ed. Wiley, 1989) page 7 to page 23.

More definitely, it is preferably expressed with some 500 to 100,000 cps in dope viscosity. Less than 500 cps causes troublesome handleability because of the excessive flowability, while more than 100,000 cps are met by difficulty in production of film with excellent surface smoothness.

Even when the same polymer is dissolved, the viscosity of the system various depending on the solvents. This is thought to be caused by a difference in affinity between the solvent and the polymer. At this point, the dioxolane system used in the present invention shows a tendency of lower viscosity, thus, has high industrial value because the same viscosity means that the polymer solution of a higher concentration is given.

According to the present invention, cast film of decreased remaining solvent can be readily obtained. For example, methylene chloride boils at 40° C., while dioxolane at 76° C., but it has been found that there is no significant difference in residual solvent, when the cast film is treated under similar drying conditions. It is presumably due to the mutual interaction between the polycarbonate molecules and the solvent molecules, but it is a quite unexpected fact. Thus, according to the present invention, industrially advantageous film drying becomes possible with similar installations in almost same costs despite that dioxolane does not boil at a so low temperature as methylene chloride does. Simultaneously, since it is halogen-free, dioxolane is very advantageous from a global environmental point of view as well as to the purpose to reduce the chloride ion content in the film.

In order to produce film, the polycarbonate in dioxolane (dope) according to the invention is cast onto a support which is heated at a temperature from 20° C. to about 10° C. lower than the boiling point of the solvent, as a support, for example, glass, stainless steel or ferrotype plate, or as occasion calls, a plastic film such as polyethylene terephthalate or polyethylene 2,6-naphthalate film, and the surface shape and film thickness are adjusted with a doctor blade of an appropriate space. Practically, a support of endless metal plate is generally used. The solution layer which is adjusted to a certain uniform thickness on the support can be given not only by sweeping the layer with a doctor blade but also by usual thick coating technique such as a reverse roll coater or casting from a die.

According to the present invention, the film is prepared by casting a polycarbonate solution on the support and evaporating the solvent with heat. The film production process according to the present invention comprises 3 stages, namely (1) casting, (2) pre-drying and (3) post-drying. The casting process (1) means the process where the film dope is cast on the support; the pre-drying process (2), the one where most of the solvent is evaporated off from the cast dope and the post-drying process (3), the one where the remaining solvent is removed.

In other words, the present invention is a production process for a polycarbonate film for optical uses characterized by that the above-stated dope is cast on a support and dried until the solvent content reaches 5 to 25% by weight, the film is peeled off from the support and further dried, as it is kept shrinkable in the widthwise direction, by heating it in a temperature range (T) satisfying the equation (I) which is continuously or sequentially raised with the variation of $Tg'$:

$$Tg' - 50° C. \leq T \leq Tg' \qquad (I)$$

where $Tg'$ is the glass transition point of the polycarbonate containing the remaining solvent.

In the casting process, the die-extrusion, doctor blading, reversed roll coating or the like are employed. It is the most typical in industry that the dope is continuously extruded from the die onto the support plate placed on the belt or drum.

The material as a support is not specifically limited, but a glass base plate, a metal base plate such as a stainless steel plate or a ferrotype plate or a plastic plate such as polyethylene terephthalate can be used. In order to produce films of high optical isotropy and uniformity, which is one of the major objects of the invention, however, the metal base plate having the surface mirror-finished is generally used.

The dope temperature on the casting according to the present invention is 10° to 60° C., preferably 30° to 60° C. In order to obtain films excellent in smoothness, the solution extruded out of the die should be cast and smoothened on the support. At this time, a too high temperature is undesired because the surface dries and solidifies before it is smoothened.

In (2) pre-drying process, almost of the solvent in the solution is needed to vaporized off in a short time as much as possible after it is cast on the support. But, rapid evaporation causes bubble formation and the drying conditions should be selected cautiously. According to the present invention, the pre-drying is conducted at 30° to 130° C., preferably 40° to 120° C. If the temperature is sequentially or continuously raised on the predrying, efficient drying can be done without losing a high degree of the smoothness.

The cast solution may be blown for high-efficiency drying. The air flow rate is generally less than 20 m/sec, preferably more than 15 m/sec. It is undesirable that lower flow rate gives insufficient effect, while higher flow rate roughens the film surface by its turbulence. In this case, the flow rate is kept low at the initial stage of the drying process, then increased sequentially or continuously as the remaining solvent decreases.

At this stage, the film is on the support, then peeled off therefrom at the end of the process. If the solvent remains large in the film, the film is soft to cause its flow deformation. Generally, 5 to 25% by weight, preferably 5 to 20% by weight is selected as the final remaining solvent.

In the post-drying process (3), the film peeled off from the support is further dried to lower the remaining solvent. The solvent remains finally less than 3% by weight, preferably less than 1% by weight.

In this process, the film is kept shrinkable in the widthwise direction. In other words, it is not preferred that the film is held with tenters. Generally, in this process, the film is dried, as it is conveyed with the pin-tenters. In the case where tenters are used, ununiform forces are loaded on the film by its own weight, shrinkage by solvent evaporation or wind pressure. Although this force seems to be slight apparently for winding up, it cannot be neglected for making the films of which a high degree of optical isotropy is required, as shown in the comparative example 1. Moreover, at the stage coming into this process, the film is very sensitive to deformation because it contains a large amount of the solvent.

The drying is conducted in such a temperature range as satisfying the equation given below. As demonstrated in comparative example 2 (FIG. 1), the glass transition point of polycarbonate largely depends on the amount of the solvent remaining in the film to drop markedly with increase in the remaining solvent. The film becomes very sensitive to deformation with the reduction in the glass transition points.

According to the present invention, the object can be attained by drying the film as the drying temperature (T) is continuously or sequentially raised with increase in $Tg'$ ($Tg'$ is the glass transition point of polycarbonate in which the solvent remains) in the range satisfying the equation (I):

$$(Tg' - 50° C.) \leq T \leq Tg' \qquad (I)$$

preferably equation (I)':

$$(Tg' - 20° C.) \leq T \leq Tg' \qquad (I').$$

Here, $Tg'$ depends on not only the amount of the solvent remaining, but also the kinds of the solvents. In the post-drying process, the solvent remaining in the film decreases and $Tg'$ rises, as the film is conveyed. Accordingly, the film can be dried efficiently without distortion in this process by raising the drying temperature, as $Tg'$ rises. The temperature lower than Tg'−50° C. is undesirable because efficient drying becomes impossible. Conversely, over T'g undesirably causes distortion.

The temperature may be increased continuously, but sequential rise with 3 to 10 steps, preferably 4 to 7 steps, depending upon the Tg', are preferably adopted from the equipment point of view. In this case, it is advantageous to effect drying by blowing air as in the pre-drying process.

The film is conveyed at any speed which is not specifically limited, but generally at 0.5 to 15 m/min. and preferably at 1 to 10 m/min.

As state above, a resin lowers its glass transition point (Tg'), when it contains a solvent. In the meantime, when a film is drawn, as containing a solvent, orientation is caused as in the case where the film is solvent-free, and the degree of orientation varies depending upon the kinds and the content of the solvent. In the case of a polycarbonate film containing dioxolane or a solvent composition mainly comprising dioxolane according to the present invention, the degree of orientation (corresponding to retardation) has low dependence upon the drawing temperature, and it is definitely more advantageous than the film containing the same amount of methylene chloride. Thus, the film according to the present invention can be advantageously utilized for producing a phase difference film of reduced fluctuation in its retardation by drawing the film under such conditions (Examples 13 to 17).

Thus, the film having uniform phase difference can be given by drawing the film formed in accordance with the present invention, while it contains the solvent by 0.3 to 5% by weight, preferably 0.5 to 3% by weight.

The resultant film is not specifically limited in its thickness, but generally 5 to 500 μm thick, preferably 10 to 300 μm thick.

According to the present invention, a polycarbonate film for optical uses is provided, satisfying the following equation (II):

$$[(R_{40}-R_0)\times 10^4]/Mw < 3.0 \qquad (II)$$

where $R_0$ is the retardation value in the perpendicular direction to the film face.

$R_{40}$ is the retardation value, when it is measured by inclining the film face by 40° from the perpendicular direction on the slow axis of the film.

Mw is the viscosity-average molecular weight of the polycarbonate.

Mw is more than 40,000, preferably less than 200,000. The viscosity-average molecular weight is measured by the method stated above.

When the value of $[(R_{40}-R_0)\times 10^4]/Mw$ is larger than 3.0, the dependence of the film phase difference on the angle tends to become large, particularly the optical isotropy is unsatisfactory as a support for a liquid crystal cell as wells as the retardation values undesirably fluctuate too largely to be the bulk film for a phase difference film.

The thickness of the film according to the present invention is not particularly limited, but, generally 5 to 500 μm, preferably 10 to 300 μm. But, if the multi-stage casting process, the laminating process or the like is applied, the products of desired large thickness can be produced.

ADVANTAGEOUS EFFECT OF THE INVENTION

According to the present invention, polycarbonate film of excellent transparency and low optical anistropy can be produced by using a good-quality polycarbonate dope which is prepared by dissolving polycarbonate in a solvent mainly comprising dioxolane, thus having low viscosity and causing no increase in the solution viscosity and no turbidity.

Further, according to the present invention, transparent and smooth films of high optical isotropy and uniformity can be obtained by effecting strict control of the drying conditions, when the film is cast from a polycarbonate solution.

EXAMPLE

The present invention will be illustrated by examples.

The measurements in the examples were made by the following procedures:

The solvent remaining in the film:

The sample was dried at 150° C. for 16 hours and weighed before and after the drying.

Thermal shrinkage:

A film sample 10 cm long was heated at 140° C. for 30 minutes and the length was measured before and after the heating.

Haze:

It was determined with an ultraviolet-visible spectrophotometer (UV-240) made by Shimadzu Seisakusho Co. Ltd.

Solution viscosity:

It was measured at 25° C. by use of Couette-type viscometer (BH type) made by Tokyo Keili K.K. Co. Ltd.

Dope stability:

Individual resin solutions are air-tightly stored in sample bottles of 50 ml capacity and allowed to stand at room temperature. The appearance is observed and the changes were described as follows:

⊚: no change in the appearance after 3 days

×: solidification or turbidity formation after 3 days

Retardation:

Optical birefringence was measured in the visible light of 590 nm wavelength using an automatic birefringence meter (KOBRA-21AD) made by Kanzaki Seishi K.K. $R_0$ and $R_{40}$ were measured as follows:

$R_0$: the retardation value in the perpendicular to the film face, $R_{40}$: the retardation value measured by the inclining the film face by 40° from the perpendicular direction on the slow axis of the film.

EXAMPLE 1

Twelve parts by weight of polycarbonate resin (Panlite (the registered trade name) L-1225 produced by Teijin Chemical Co.; viscosity-average molecular weight: 24,000) were added to 88 parts by weight of dioxolane, they were thoroughly stirred to prepared a dope. The dope was allowed to stand at room temperature, but no viscosity increase was observed and the fluidity was maintained for 7 days after dope preparation.

The dope was cast on a glass plate using a doctor blade of 0.4 mm clearance and dried by heating at 100° C. for 30 minutes to give clear film.

EXAMPLE 2

Twelve parts by weight of polycarbonate resin (Panlite (the registered trade name) C-1400 produced by Teijin Chemical Co.; viscosity-average molecular weight: 37,000) were added to a mixture of 70 parts by weight of dioxolane and 18 parts by weight of methylene chloride and the storage stability was examined. No change into gel was observed, while the solution was allowed to stand for 10 day. The dope was employed as in example 1 and clear film was obtained.

EXAMPLE 3

Fifteen parts by weight of polycarbonate resin (Panlite (registered trade name) L-1225 produced by Teijin Chemical Co.; viscosity-average molecular weight: 24,000) were added by portions to a homogeneously mixed solvent comprising 55 parts by weight of dioxolane and 30 parts by weight of dioxane to form a dope. This dope was examined on its storage stability, and it was found that its fluidity was kept and no gelation occurred, even after it was stored for one week. The dope gave clear film, when it was subjected to film formation as in example 1.

EXAMPLE 4

(Preparation of the dope)

Polycarbonate resins listed in Table 1 were thoroughly stirred together with dioxolane at 50° C. to form solutions. The resultant polycarbonate resin solutions were measured on their viscosity by means of a Couette-type viscometer. Further, they were allowed to stand at room temperature and the change of their appearance was examined after 3 days, but they were found to be very stable with no change. The results are summarized in Table 1.

(Production of the film)

The dope of the polycarbonates given in *1 in Table 1 in dioxolane was cast onto a glass plate which was kept at 60° C. using a doctor blade of 0.8 mm clearance. Then, the cast film was allowed to stand for 2 minutes and dried with an air flow of 0.9 m/sec. for 15 minutes. The film was peeled off from the glass support and dried by treating it with heat at 130° C. under an air flow rate of 1 m/sec for 30 minutes. Thus, clear film (Haze value: 0.6) were obtained. The retardation value was 4 nm.

COMPARATIVE EXAMPLE 1

(Preparation of the dope)

The procedure in Example 1 was repeated except that the solvent was changed to methylene chloride and stirring was continued at 25° C. The measurements were also made in the same manner. The results are listed in Table 1. As seen clearly in the results, the solution viscosity doubled that of the solution in dioxolane, but no change in the appearance was noticed.

(Production of the film)

The film obtained from the dope of 20% by weight of polycarbonate (C-1400) *1 in Table 1 in methylene chloride was found to have 0.1 Haze value. On the film casting, the support plate was kept at 20° C. and the initial temperature for drying was 40° C. The retardation of this film was 6 nm.

TABLE 1

| Polycarbonates | | Dopes in dioxolane | | Dopes in methylene chloride | |
| --- | --- | --- | --- | --- | --- |
| | | Polycarbonate concentration | Viscosity | Polycarbonate concentration | Viscosity |
| Units | M. W. | (% by weight) | (cps) | (% by weight) | (cps) |
| Bisphenol-A *1 | 37,000 | 20 | 2,700 | 20 | 5,300 |
| Bisphenol-A *2 | 70,000 | 15 | 12,000 | 15 | 27,000 |
| Bisphenol-A *3 | 69,000 | 15 | 10,100 | 15 | 25,000 |
| Bisphenol-A *4 | 105,000 | 8 | 6,200 | 8 | 15,000 |
| Bisphenol-A (95 mole %) Bisphenol-Z (5 mole %) *5 | 37,000 | 25 | 11,000 | 25 | 28,000 |
| Bisphenol-A (95 mole %) Bisphenol-FL (5 mole %) *6 | 37,000 | 25 | 9,800 | 25 | 27,000 |

Notes:
*1: Teijin Chemicals Ltd. Panlite C-1400; viscosity-average molecular weight, 37,000; Tg, 156° C.

*2: viscosity-average molecular weight, 70,000; Tg, 162° C.
*3: viscosity-average molecular weight, 69,000; Tg, 161° C.
*4: viscosity-average molecular weight, 105,000; Tg, 162° C.
*5: Polycarbonate copolymer from bisphenol-A (95 mole %) and bisphenol-Z (5 mole %); viscosity-average molecular weight, 37,000; Tg, 158° C.
*6: Polycarbonate copolymer from bisphenol-A (95 mole %) and bisphenol-FL (5 mole %); viscosity-average molecular weight, 37,000; Tg, 165° C.
The polycarbonate concentration means the % by weight of polycarbonate per the dope total weight.

EXAMPLE 5 TO 11 AND COMPARATIVE EXAMPLE 2 TO 6

(Preparation of the dope)

As in Example 1, various kinds of polycarbonates shown in Table 2 were dissolved individually in solvents of various compositions given in Table 2 in the concentrations described in Table 2, and their behaviors of these dopes were observed. The composition of the solvents, the dope viscosities and the stability of the resultant dopes were measured in the same methods as in Example 1. The results are given in Table 2.

the results are described in Table 3.

TABLE 2

| | Polycarbonates | | Solvents | | Polycarbonate | Dope | Dope |
| | | | Dioxane | Other solvent | Concentration | Viscosity | Stability |
| No. | items | M. W. | (wt %) | Compounds | (wt %) | (wt %) | (cps) | after 3 days |
|---|---|---|---|---|---|---|---|---|
| Ex. 5 | C-1400 | 37,000 | 80 | tetrahydrofuran | 20 | 15 | 2900 | ○ |
| Ex. 6 | C-1400 | 37,000 | 80 | cyclohexanone | 20 | 15 | 4100 | ○ |
| Ex. 7 | C-1400 | 37,000 | 60 | cyclohexanone | 40 | 15 | 5100 | ○ |
| Ex. 8 | C-1400 | 37,000 | 80 | methylene chloride | 20 | 20 | 3600 | ○ |
| Ex. 9 | C-1400 | 37,000 | 60 | methylene chloride | 40 | 20 | 4000 | ○ |
| Ex. 10 | BP/Z5*1 | 52,000 | 100 | — | 0 | 20 | 11200 | ○ |
| Ex. 11 | BP/FL5*2 | 37,000 | 100 | — | 0 | 20 | 2700 | ○ |
| Comp. 2 | C-1400 | 37,000 | 0 | tetrahydrofuran | 100 | 20 | 900 (50° C.) | x |
| Comp. 3 | C-1400 | 37,000 | 0 | dioxane | 100 | 20 | 6800 | x |
| Comp. 4 | C-1400 | 37,000 | 0 | cyclohexanone | 100 | 20 | 7900 | x |
| Comp. 5 | BP/Z5*1 | 52,000 | 0 | methylene chloride | 100 | 20 | 26000 | ○ |
| Comp. 6 | BP/FL5*2 | 37,000 | 0 | methylene chloride | 100 | 20 | 4450 | ○ |

Notes:
*1: BP/Z5: copolymer of bisphenol-A (95 mole %) and bisphenol-Z (5 mole %) (viscosity-average molecular weight: 37,000)
*2: BP/FL5: copolymer of bisphenol-A (95 mole %) and bisphenol-Fl (5 mole %) (viscosity-average molecular weight: 37,000)
The concentration of polycarbonates is defined as the % by weight of polycarbonate based on the total weight of the dope.

TABLE 3

| No. | Solvent remaining in the film after 15-minute heating at 80° C. (wt %) | Drying conditions (°C.) | Drying conditions (min) | Residual solvents (wt %) | Transparency (haze) (%) | Optical anisotropy (retardation) (nm) | Thermal shrinkage (%) | Remarks |
|---|---|---|---|---|---|---|---|---|
| Ex. 5 | 9.8 | 135 | 30 | 1.4 | 0.9 | 7 | 0.4 | Clear appearance |
| Ex. 6 | 15.0 | 135 | 30 | 4.0 | 0.5 | 6 | — | Clear appearance |
| Ex. 7 | 20.0 | 135 | 30 | 3.2 | 0.9 | 7 | 2.0 | Clear appearance |
| Ex. 8 | 9.2 | 130 | 15 | 0.7 | 0.3 | 6 | — | Clear appearance |
| Ex. 9 | 9.0 | 130 | 20 | 1.1 | 0.5 | 5 | — | Clear appearance |
| Ex. 10 | 9.8 | 135 | 30 | 1.3 | 0.3 | 4 | 0.3 | Clear appearance |
| Ex. 11 | 9.9 | 135 | 30 | 1.4 | 0.3 | 5 | — | Clear appearance |
| Comp. 2 | 9.7 | 130 | 30 | 2.1 | 27.7 | 8 | 0.8 | White turbidity |
| Comp. 3 | 12.0 | 135 | 30 | 2.7 | 0.3 | 11 | — | Clear appearance |
| Comp. 4 | 32.0 | 135 | 30 | 4.5 | 13.6 | 12 | 1.8 | White turbidity |
| Comp. 5 | 8.3 | 120 | 10 | 2.5 | 0.3 | 9 | — | Clear appearance |
| Comp. 6 | 8.3 | 120 | 10 | 2.1 | 0.1 | 8 | — | Clear appearance |

(Production of the films)

These dopes were individually cast onto a glass plate using a doctor blade of 0.8 mm clearance and heated at 80° C. for 15 minutes. The amounts of the solvents remaining in the films after heating are shown in Table 3. Then, the films were peeled off from the glass plate and dried by heat-treating at the drying temperature given in Table 3 for minutes shown in Table 3, as they were kept freely shrinkable in the widthwise direction to give the final film products of about 100 μm thickness. These films were measured on their solvent content, thermal shrinkage and film haze and

REFERENCE EXAMPLE 1

A bisphenol-A polycarbonate (viscosity-average molecular weight: $3.7 \times 10^4$) was dissolved in methylene chloride to prepare a solution of 20% by weight concentration, from which a film 102 μm thick was formed.

The film was subjected to tensile tests at a variety of temperature to measure the ratio of the strength (P) to the elongation (P/E). Further, retardation (Re) corresponding to a variety of elongations (E) at the corresponding temperatures to calculate Re/E.

As shown in Table 4, P/E and Re/E largely depended on the temperatures. Particularly, P/E drastically reduced as the temperature comes near the glass transition point of the film (Tg'=158° C.). From the value of Re/P, the maximum tension (T) permissible for holding down Re lower than 10 nm can be obtained. As shown in Table 4, T also largely decreases as the temperature gets near the Tg'. For example, the maximum 20 kg is permissible at 100° C., while only 0.76 kg allows the retardation to reach 10 nm at 150° C. This results tells us that a slight force can cause optical strain near Tg' despite that the film is free from the solvent. When the solvent remains in the film, its Tg' is greatly lowered and the optical strain is caused with a more slight force.

TABLE 4

| Temperature (°C.) | P/E kg/mm$^2$ | Re/E (nm) | Re/P (nm/kg/mm$^2$) | T (kg) |
|---|---|---|---|---|
| 100 | 110 | $5.6 \times 10^3$ | $5.1 \times 10^1$ | 20 |
| 110 | 110 | $4.5 \times 10^3$ | $5.0 \times 10^1$ | 20 |
| 120 | 72 | $4.3 \times 10^3$ | $6.0 \times 10^1$ | 17 |
| 130 | 48 | $3.6 \times 10^3$ | $7.5 \times 10^1$ | 13 |
| 140 | 4.4 | $3.4 \times 10^3$ | $7.7 \times 10^2$ | 1.3 |
| 150 | 1.8 | $2.3 \times 10^3$ | $1.3 \times 10^3$ | 0.76 |
| 160 | 0.47 | $1.7 \times 10^3$ | $3.7 \times 10^3$ | 0.27 |

REFERENCE EXAMPLE 2

The polycarbonate used in reference example 1 was dissolved in methylene chloride, 1,3-dioxolane, 1,4-dioxane, 1,2-dichloroethane and cyclohxanone, respectively to prepare solutions of 20% by weight concentration. Films 100 μm thick having different amounts of the solvents remaining in them were prepared from the solution by varying the drying conditions. The glass transition point of these films (Tg') are shown in FIG.1. As clearly shown in the figure, Tg's of all the films examines markedly reduced as the amounts of the solvents remaining in the films increased. The degrees of the reduction largely depended on the kinds of the solvents.

EXAMPLE 12

A polycarbonate copolymer with a viscosity-average molecular weight of $4.4 \times 10^4$, comprising biphenol-A and 2-bis(4-hydroxyphenyl)cyclohexane (molar ratio=95/5) was dissolved in 1,3-dioxolane and the resultant 20% by weight solution was used to effect continuous film preparation.

In the casting unit used, the dope was extruded through the die onto the stainless belt connected to the pre-drying furnace which is sectioned into 4 stages. The film peeled off from the belt was passed through the post-drying furnace which is sectioned into 6 stages. The film was cast using the installation, then the temperature was sequentially raised up to 40°, 80° and 90° C., and finally cooled down to 40° C. in the pre-drying furnace. Thus, the content of the solvent remaining in the film was 13.5% by weight.

At this stage, the film was peeled off from the belt and sent to the post-drying furnace. The temperature of the post-drying furnace was set, corresponding to the amounts of the remaining solvent, to 40° C. (the remaining solvent: 13.5%, Tg'=50° C.), 75° C. (the remaining solvent: 5.5%, Tg'=91° C.), 100° C. (the remaining solvent: 3.2%, Tg'=113° C.), 120° C. (the remaining solvent: 1.2%, Tg'=141° C.) and 140° C. (the remaining solvent: 0.8%, Tg'=145° C.) to obtain the dried film. The final remaining solvent was found to be 0.3% by weight in the film. The thickness was 100±1.3 μm with extremely uniformity. The transmittance was 91%. The retardation (Re) was 17±2 nm with extremely small anisotropy and fluctuation range.

EXAMPLES 13 TO 17

Polycarbonate resins given in Table 5 were thoroughly stirred together with dioxolane at 50° C. to form a solution of 15% concentration. The polycarbonate resin solution kept at room temperature is cast on a stainless steel plate kept at 60° C. using a doctor blade having 0.8 clearance. After about 2 minutes, the film was pre-dried at 90° C. for 10 minutes, and at 120° C. for 20 minutes, then the film was peeled from the stainless steel plate and dried at 135° C. The resultant film was measured on its thickness, the solvent amount remaining in and retardation to calculate $[(R_{40}-R_0) \times 10^4]/Mw$. In this example, the film was dried at the same initial temperature as that of the comparative examples. The results are given in Table 5. In the table, the letter A at the tail of the numbers means the specimens after completion of the pre-drying, while letter B means that after completion of the post-drying.

EXAMPLE 18

The polycarbonate resins given in Table 5 was thoroughly stirred at 50° C. together with dioxolane to prepare 15% solution. The polycarbonate resin solution kept at room temperature is cast on a stainless steel plate kept at 40° C. using a doctor blade having 0.8 clearance. After about 2 minutes, the film was pre-dried at 40° C. for 10 minutes, and at 80° C. for 80 minutes, then the film was peeled from the stainless steel plate. The resultant film was measured on its thickness, the solvent amount remaining in and retardation to calculate $[(R_{40}-R_0) \times 10^4]Mw$. In this example, the film was dried at the same initial temperature as that of the comparative examples. The results are given in Table 5.

COMPARATIVE EXAMPLES 7 TO 12

The same procedures in example 18 were repeated except that the solvent is changed to methylene chloride and dissolution with stirring was effected at 25° C. Drying was carried out at 40° C. for 10 minutes, at 80° C. for 80 minutes, and, at 130° C. for 1 hour, after peeling. The measurements were done as in examples and the results are given in Table 5.

TABLE 5

| No. | | Polycarbonates bisphenols (proportion) | M.W. (×1000) | Film Characteristics | | | | |
|---|---|---|---|---|---|---|---|---|
| | | | | Thick. (μm) | Solvent (wt %) | $R_0$ | $R_{40}-R_0$ | MOF* |
| Examples | | | | | | | | |
| 13 | 13A | A (homopolymer) | 37 | 94 | 7.9 | 6.5 | 7.2 | 1.91 |
| | 13B | " | | 90 | 0.4 | 6.0 | 6.9 | 1.87 |
| 14 | 14A | A (homopolymer) | 69 | 90 | 6.0 | 4.7 | 10.5 | 1.52 |
| | 14B | " | | 88 | 1.2 | 3.9 | 8.5 | 1.23 |
| 15 | 15A | A (98 mole %) | 53 | 117 | 7.3 | 6.7 | 10.7 | 2.00 |
| | 15B | Z (2 mole %) | " | 109 | 0.9 | 6.1 | 9.2 | 1.73 |
| 16 | 16A | A (97 mole %) | 73 | 94 | 7.7 | 5.4 | 12.4 | 1.70 |
| | 16B | FL (3 mole %) | " | 96 | 1> | 6.9 | 11.8 | 1.61 |
| 17 | 17A | A (99 mole %) FL (1 mole %) | 78 | 89 | >7 | 5.6 | 14.2 | 1.82 |
| 18 | 18A | A (90 mole %) FL (10 mole %) | 160 | 88 | 10.8 | 7.3 | 21.5 | 1.34 |
| Comparison | | | | | | | | |
| 7 | 7A | A (homopolymer) | 37 | 103 | 7.5 | 4.3 | 15.3 | 4.11 |
| | 7B | " | | 101 | 1> | 5.4 | 15.2 | 4.09 |
| 8 | 8A | A (homopolymer) | 69 | 112 | 7.3 | 5.4 | 22.9 | 3.31 |
| | 8B | " | | 101 | 1> | 3.9 | 25.2 | 3.65 |
| 9 | 9A | A (98 mole %) | 53 | 94 | 7.1 | 9.4 | 21.7 | 4.09 |
| | 9B | Z (2 mole %) | " | 87 | 1> | 6.8 | 16.5 | 3.17 |
| 10 | 10A | A (97 mole %) | 73 | 86 | 8.5 | 9.2 | 32.7 | 4.75 |
| | 10B | FL (3 mole %) | " | 104 | 1> | 8.3 | 29.3 | 4.00 |
| 11 | 11A | A (homopolymer) | 105 | 110 | >7 | 9.0 | 88.8 | 8.45 |
| 12 | 12A | A (90 mole %) FL (10 mole %) | 160 | 70 | 7.7 | 6.7 | 76.8 | 4.8 |

Note:
*MOF = $[(R_{40}-R_0) \times 10^4]$/Mw

EXAMPLE 19

A polycarbonate copolymer from bisphenol-A and bisphenol-FL (5 mole %) (viscosity-average molecular weight: 37,000) was dissolved in dioxolane to prepare a dope of 20% by weight resin concentration). The dope was cast as in example 4 to give a film. The amount of the solvent remaining in this film was 0.9%. The resultant film was preheated at 160°, 170° and 180° C. for 1 minutes, respectively, then monoaxially oriented in the lengthwise direction to given phase difference films. The retardation of the films was measured and the result is given in Table 6.

Since the polycarbonate films according to the present invention has small fluctuation in retardation due to the change in the drawing temperature, the retardation fluctuation of said film is so small with extremely uniform optical birefringence characteristics that the film can be used very successfully as a retardation film used in, for example, liquid crystal displays.

TABLE 6

| | Drawing temp. (°C.) | Drawing ratio | Retardation (nm) | Retardation change with Drawing temp. |
|---|---|---|---|---|
| Example 19 | 160 | 1.3 | 480 | 16.5 nm/°C. |
| | 170 | 1.3 | 300 | |
| | 180 | 1.3 | 150 | |
| Comparison Example 13 | 160 | 1.3 | 800 | 33.0 nm/°C. |
| | 170 | 1.3 | 420 | |
| | 180 | 1.3 | 140 | |

COMPARATIVE EXAMPLE 13

The copolymer used in example 19 was dissolved in methylene chloride to prepare a dope (resin concentration: 20% by weight). The dope was cast as in example 4 to prepare a film. The amount of the solvent remaining in the film was 2.5%. The resultant polycarbonate film was used to prepare a retardation film in the same manner as in example 4. The retardation of the phase difference film was measured and the result was shown in Table 6.

Figure 1:
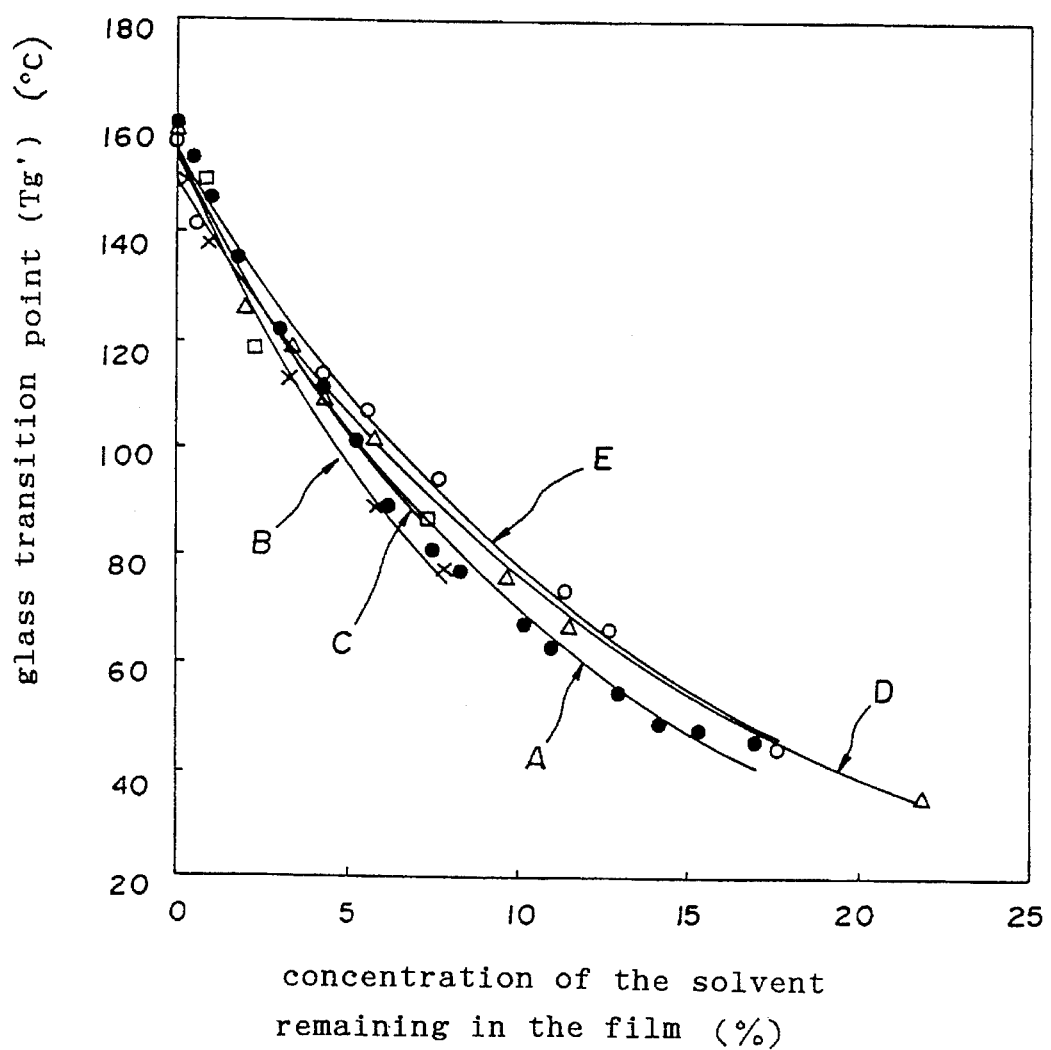
FIG. 1 shows the relation between the glass transition point (Tg') of the film prepared in reference example 1 and the concentration of the solvent remaining in the film.

The designations in FIG. 1 is as follows:

A: methylene chloride was used as a solvent,

B: dioxolane was used as a solvent,

C: 1,2-dichloroethane was used as a solvent,

D: dioxane was used as a solvent, and

E: cyclohexane was used as a solvent.

We claim:

1. A process for producing a polycarbonate film for optical use comprising casting a dope onto a support and evaporating the solvent with heat wherein the process comprises the steps of:

preparing the dope by dissolving 10 parts by weight of a polycarbonate in 25 to 150 parts by weight of a solvent containing more than 60% by weight of dioxolane, casting such onto the support to form a film, drying such to 5 to 25% by weight solvent remaining in the film, then peeling off the film, and heating the film, as it is kept shrinkable in the widthwise direction, in the temperature range (T) satisfying the equation (I) given below in accordance with the change in Tg':

$$Tg'-50°C. \leq T \leq Tg' \qquad (I)$$

wherein Tg' is the glass transition point of the polycarbonate containing the remaining solvent.

2. The process for producing a polycarbonate film for optical use according to claim 1 wherein the polycarbonate resin has the viscosity-average molecular weight ranging from 10,000 to 200,000.

3. The process for producing a polycarbonate film for optical use according to claim 1 wherein the solvent comprises more than 60% by weight of dioxolane and at least one solvent selected from the group consisting of cyclohexanone, tetrahydrofuran and dioxane.

4. A process of claim 1 wherein the polycarbonate has recurring units represented by

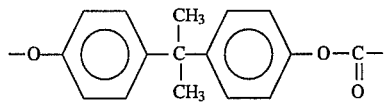

or a copolymer thereof, wherein copolymerization components are selected from the group consisting of 1,1-bis(4-hydroxyphenyl)cyclohexane, 9,9-bis(4-hydroxy-phenyl)fluorene, and 1,1-bis(4-hydroxyphenyl- 3,3,5-trimethylcyclohexane.

* * * * *